(12) United States Patent
Abraham et al.

(10) Patent No.: US 10,025,548 B2
(45) Date of Patent: Jul. 17, 2018

(54) AUTOMATED DISPLAY CONFIGURATION

(71) Applicant: INTERNATIONAL BUSINESS MACHINES CORPORATION, Armonk, NY (US)

(72) Inventors: Subil M. Abraham, Lewisville, TX (US); Marco A. Benavides, Carrollton, TX (US); Stephanie De La Fuente, Lewisville, TX (US)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 15/231,853

(22) Filed: Aug. 9, 2016

(65) Prior Publication Data

US 2018/0046423 A1 Feb. 15, 2018

(51) Int. Cl.
*G06F 3/14* (2006.01)
*G09G 5/30* (2006.01)
*G06F 3/01* (2006.01)

(52) U.S. Cl.
CPC .......... *G06F 3/1423* (2013.01); *G09G 5/30* (2013.01); *G06F 3/012* (2013.01); *G06F 3/013* (2013.01); *G06F 2203/04803* (2013.01); *G09G 2320/0693* (2013.01); *G09G 2320/08* (2013.01); *G09G 2354/00* (2013.01)

(58) Field of Classification Search
CPC ......... G06F 3/1423; G06F 2203/04803; G06F 3/012; G06F 3/013; G09G 5/30; G09G 2354/00; G09G 2320/08; G09G 2320/0693
See application file for complete search history.

(56) References Cited

U.S. PATENT DOCUMENTS

| 2011/0199539 A1 | 8/2011 | Oh et al. |
| 2014/0118400 A1 | 5/2014 | Chen et al. |
| 2014/0195927 A1 | 7/2014 | Deweese et al. |
| 2014/0298246 A1* | 10/2014 | Wang .............. G06F 3/0488 715/781 |

(Continued)

FOREIGN PATENT DOCUMENTS

| WO | 0127800 | 4/2001 |
| WO | 2014132472 | 9/2014 |

*Primary Examiner* — Andrew Sasinowski
(74) *Attorney, Agent, or Firm* — Schmeiser, Olsen & Watts, LLP; Daniel Simek

(57) ABSTRACT

Systems, methods and tools for automatically configuring multiple display devices. The systems tools and methods automatically determine the user of the display device, a user's display device preferences, collect feedback, user context and information of the surrounding environment as the display devices are used by the user and continuously adjust the display device settings based on the user's interactions with the display device to better optimize the user's experience with the display device. User settings and preferences can be remotely accessible via a computer network such as the cloud. The remotely accessible customized display settings can be retrieved from locations around the world and applied automatically to display devices where the user may be present. The systems, methods and tools for automatically configuring multiple display devices are applicable to both instances where a single user is present or multiple users are sharing a display device together.

20 Claims, 9 Drawing Sheets

(56) References Cited

U.S. PATENT DOCUMENTS

| | | | |
|---|---|---|---|
| 2015/0262331 A1* | 9/2015 | Bang | G06F 3/1431 345/1.3 |
| 2016/0062722 A1 | 3/2016 | Cronin et al. | |
| 2016/0070344 A1* | 3/2016 | Gohl | G06F 3/013 345/156 |
| 2016/0188973 A1* | 6/2016 | Ziaja | G06F 21/84 382/116 |

* cited by examiner

AUTOMATED DISPLAY CONFIGURATION

TECHNICAL FIELD

The present disclosure relates generally to systems, methods and tools for configuring a display device.

BACKGROUND

Electronic display devices are commonly used for outputting information from a computer system into a format viewable by individual users. Display devices for computer systems, such as a computer monitor, have evolved over the years from cathode ray tubes (CRT) to the more presently used liquid crystal displays and flat panel LED displays. As the technology of display devices have evolved, the costs of display devices have decreased significantly over the years while the sizes of even large display devices have become quite affordable. As a result of display device evolution and reduced costs, the use of multiple displays by computer enthusiasts and enterprises continues to grow. Using more than one display allows a user to stretch his or her desktop to show more programs than if a single display is used. Moreover, a single program may be stretched over multiple displays so that more of a document, such as a spreadsheet, may be seen without scrolling while multiple programs and application can be visible simultaneously instead of overlapping one another.

It has been found that using multiple display devices makes workers more productive. According to well-known industry leaders, NEC Display Solutions of America and ATI Technologies, increases in productivity can be attributed to the adoption of multiple display device arrangements. In some of the studies performed by NEC and ATI, the studies confirmed the occurrence of increased employee efficiency by between 9-50% due to adding additional display devices to a single display device setup. In view of the research result, increasing the number of display devices for employee workstations has become an evolving trend for enterprises in an effort to boost employee productivity.

SUMMARY

A first embodiment of the present disclosure provides a method for automatically configuring multiple display devices comprising the steps of identifying, by a central processing unit (CPU), a user of the multiple display devices; receiving, by the CPU, sensor data from a plurality of sensors connected to the multiple display devices; calibrating, by the CPU, an orientation and proximity of each of the multiple display devices as a function of the sensor data; automatically optimizing, by the CPU, display settings of the multiple display devices as a function of the user identified and collected data selected from the group consisting of environmental data, sensor data and user data; and displaying, by the CPU, display data outputted by the multiple display devices at the automatically optimized display settings.

A second embodiment of the present disclosure provides a computer system, comprising: a central processing unit (CPU); a memory device coupled to the CPU; multiple display devices, a sensor connected to the multiple display devices and a computer readable storage device coupled to the processor, wherein the storage device contains program code executable by the processor via the memory device to implement a method for automatically configuring the multiple display devices comprising the steps of identifying, by the CPU, a user of the multiple display devices; receiving, by the CPU, sensor data from the sensor connected to the multiple display devices; calibrating, by the CPU, an orientation and proximity of each of the multiple display devices as a function of the sensor data; automatically optimizing, by the CPU, display settings of the multiple display devices as a function of the user identified and collected data selected from the group consisting of environmental data, sensor data and user data; and displaying, by the CPU, display data outputted by the multiple display devices at the automatically optimized display settings.

A third embodiment of the present disclosure provides a computer program product comprising: one or more computer readable hardware storage devices having computer readable program code stored therein, said program code containing instructions executable by the one or more central processing units (CPU) to implement a method for automatically configuring multiple display devices comprising the steps of: identifying, by the CPU, a user of the multiple display devices; receiving, by the CPU, sensor data from a plurality of sensors connected to the multiple display devices; calibrating, by the CPU, an orientation and proximity of each of the multiple display devices as a function of the sensor data; automatically optimizing, by the CPU, display settings of the multiple display devices as a function of the user identified and collected data selected from the group consisting of environmental data, sensor data and user data; and displaying, by the CPU, display data outputted by the multiple display devices at the automatically optimized display settings.

DETAILED DESCRIPTION

Overview

Figure 1:
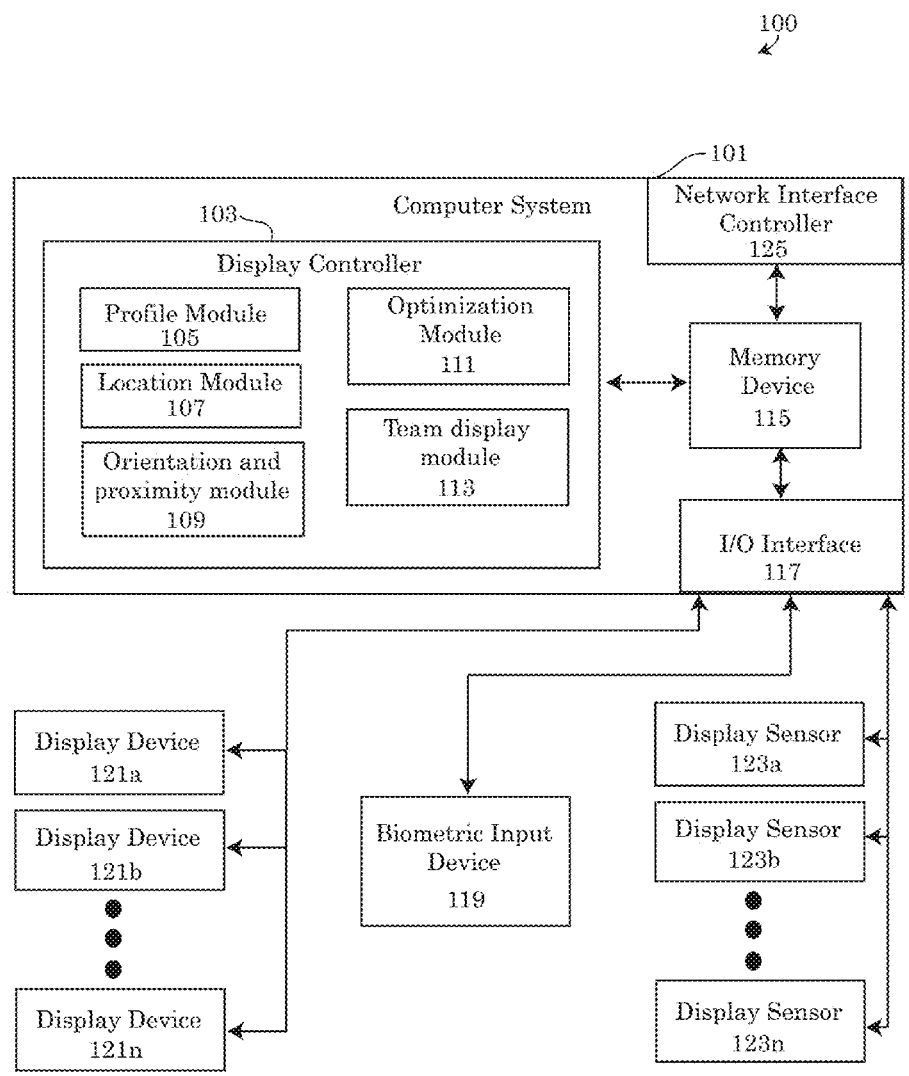
FIG. 1 depicts a schematic view of embodiment of a system for automatically configuring multiple display devices, consistent with the embodiments of the present disclosure.

Embodiments of the present disclosure recognize that the use of multiple display devices for individual users, enterprises, offices and for collaboration purposes may enhance experiences with a computer system and increase overall efficiency of the user. However, complicated multiple display setup, calibration and optimization, specifically manual calibration and optimization may be too complicated and frustrating for the average user. The added complexity of the configuration of multiple display devices may frustrate the user, create unnecessary distractions and reduce productivity. Therefore, there is a need for tools, systems and methods for automatically configuring multiple display devices in order to simplify the process for the average user and reduce the complexity or frustration that may be caused by manual configuration.

Embodiments of the present disclosure solve the problems incurred by manually adjusted multiple display devices by automatically and intelligently identifying the display devices, the environment surrounding the display device, including additional display devices and adjusting the settings of display device to the optimal configuration. The embodiments of the present disclosure may automatically determine the user; a user's display device preferences, collect feedback, user context and information of the surrounding environment continuously adjust and optimize the display devices. In some embodiments, the tools, methods and systems may store preferred settings of each user on a computer network, automatically retrieve the stored settings and apply the preferred settings to multiple display devices connected to the computer network at any location the user may be identified.

The tools, methods and systems of the present disclosure may use one or more biometric input devices, cameras and sensors mounted to the display devices to detect the user, the surrounding environment of each display device, the proximity and orientation of each display device. The combination of biometric devices and sensors may track the user's interaction with the display devices and the user's behavior while operating the display device in order to fine tune and optimize the display devices to better suit the user's needs. Customization of user settings may be performed by collecting and storing personalized data based on the user's interactions with the display devices. Using the information collected by the tools and systems connected to the display devices, sensors, cameras and biometric inputs, the embodiments of the tools and systems described herein may automatically configure the multiple display devices, display device settings and presentation of a graphical user interface (GUI) displayed by the display devices as a function of the user operating the display devices.

Embodiments of the present disclosure are not only directed to display devices operated by a single user, but may also include making automatic adjustments to display devices being operated, controlled or influenced by multiple users. For example, users making joint presentations or engaging in a web or other network based conference. The tools, methods and systems described herein, may not only adjust the display settings based on each of the user as described previously, but may automatically adjust the display device's presentation of the multiple users. For example, by automatically adjusting the proportions of the display device's screen for each user, by making the presentation space equal for all users, proportional to the role of each individual user of the group of users or adjusting the display proportions based on user activity during the collaboration or presentation.

System for Automatically Configuring Display Devices

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Referring to the drawings, FIG. 1 depicts a block diagram of a system 100 for automatically configuring multiple display devices 121a, 121b . . . 121n (hereinafter referred to collectively as "display devices 121") connected to a computer system 101. The computer system 101 may be a specialized computer system, having specialized configurations of hardware, software or a combination thereof as depicted FIG. 1-6 of the present disclosure in some embodiments. Embodiments of the computer system 101 may comprise one or more elements of the generic computer system of FIG. 8 as described in detail below. Elements of the generic computer system of FIG. 8, may be integrated into the specialized computer system 101 of FIG. 1-6.

Elements depicted in the figures having reference numbers including sub-letters and ellipses, for example the display devices 121a, 121b . . . 121n or display sensor 123a, 123b . . . 123n (hereinafter referred to as "display sensors 123") may signify that the embodiments comprising the element are not limited only to the amount of elements actually shown in the drawings, but rather, the ellipses between the letters and the $n^{th}$ element indicate a variable number of similar elements of a similar type that may be present. For instance, with regard to display sensors 123, any number of a plurality of display sensors 123 may be present, including display sensor 123a, display sensor 123b and a plurality of additional display sensors up to and including the $n^{th}$ number of display sensors 123n, wherein the variable "n" may represent the last element in a sequence of similar elements shown in the drawing. The presence of additional sensors can be seen for example in FIG. 3a wherein display device 121a and 121b are each equipped with four display sensors 123. In particular, display sensors 123a, 123b, 123c, 123d are attached to a first display device 121a and display sensors 123e, 123f, 123g, 123h attached to a second display device 121b.

In some embodiments, the computer system 101 of the configuration system 100 may include a display controller 103. The display controller 103 may be any device capable of controlling the transfer of data (including video data and audio data) between the computer system 101 and peripheral devices connected to the computer system 101. As shown in the exemplary embodiment of FIG. 1, the display controller 103 may control the transfer of data between the display sensors 123, display devices 121, biometric input device 119 and the computer system 101. The display controller 103 may be comprised of hardware, software or a combination of components in some embodiments. For example, in some embodiments, the display controller 103 may be a physical controller that may be part of an integrated circuit and may comprise chips or processors, such as a central processing unit (CPU), specialized circuitry and a memory device 115. In alternative embodiments the display controller 103 may be a virtual display controller comprised of program code containing specific program instructions loaded into the memory device 115 of the computer system 101 that may be accessing the underlying hardware components or hardware resources remotely. The computer system 101 having a virtual display controller may access virtual representations of the display controller 103 and each of the components of the display controller 103 on computer system 101 even though the display controller 103 resources may be physically located on a separate computing system.

In some embodiments of system 100, the components of the display controller 103 may include one or more modules which may perform one or more specific routines or tasks of the display controller 103. A "module" may refer to a hardware based module, software based module or a module may be a combination of hardware and software resources. A module (whether hardware, software, or a combination thereof) may be designed to implement or execute one or more particular functions, tasks or routines. Embodiments of hardware based modules may include self-contained components such as chipsets, specialized circuitry and one or more memory devices, while a software-based module may be part of a program code or linked to program code containing specific programmed instructions loaded in the memory device 115 of the computer system 101 or a remotely accessible memory device (not shown).

In some embodiments of the display controller 103, the display controller 103 may include a profile module 105. The profile module 105 may be responsible for saving, storing and retrieving user profiles and configuration settings for each of the display devices 121 managed by the system 100. Embodiments of the profile module 105 may receive data indicating the presence of one or more particular users and in response to receiving the data indicating the presence of a particular user, the profile module 105 may select the appropriate user profile and load the customized setting of a particular user profile into the memory device 115 of the computer system 101.

Embodiments of the profile module 105 may identify the user of the computer system 101 by receiving an authorization request from a user or biometric input device 119 to access a user profile stored by the profile module 105. The authorization request may include one or more types of authentication credentials demonstrating a user's rights to access a particular profile stored by the profile module 105. For example, the user may provide password authentication, smart card authentication or a biometric authentication. As shown in FIG. 1, the profile module 105 may receive biometric data for the purposes of authentication and identification of the user through one or more biometric input devices 119. Embodiments of the biometric input device 119 may include a visual or audio device such as a biometric camera and/or microphone for the purposes of facial recognition, an iris scanning, fingerprint scanning, voice recognition, hand recognition, signature recognition or other forms of biometric input known by individuals skilled in the art. Embodiments of the biometric input device 119, 419 may be integrated or mounted to one or more of the display devices 121 as shown in FIGS. 3*a*-6. In alternative embodiments, the biometric input device 119 may be a separate or stand-alone device connected to the computer system 101, for example through a USB, PCI, PCIE, Firewire or other port. In some embodiments of system 101, the biometric input device 119 may automatically identify each user, whereas in alternative embodiments, the biometric input device 119 may manually receive user-identifying input from the user before commencing the identification.

Embodiments of the biometric input device 119 may be connected to the computer system 101 and transmit user-identifying data received by the biometric input device 119 via an input/output (I/O) interface 117 of the computer system 101. An I/O interface 117 may refer to any communication process performed between the computer system 101 and the environment outside of the computer system 101, for example the biometric input device 119 and display sensors 123. Input may refer to the signals or instructions sent to the computer 101 from a source outside of the computer system 101 while output may refer to the signals sent out from the computer system 101, for example to the display devices 121. The signals, data and other information transmitted and received by the computer system 101 may be stored by one or more memory devices 115 and may be further transmitted to the display controller 103

Figure 2:
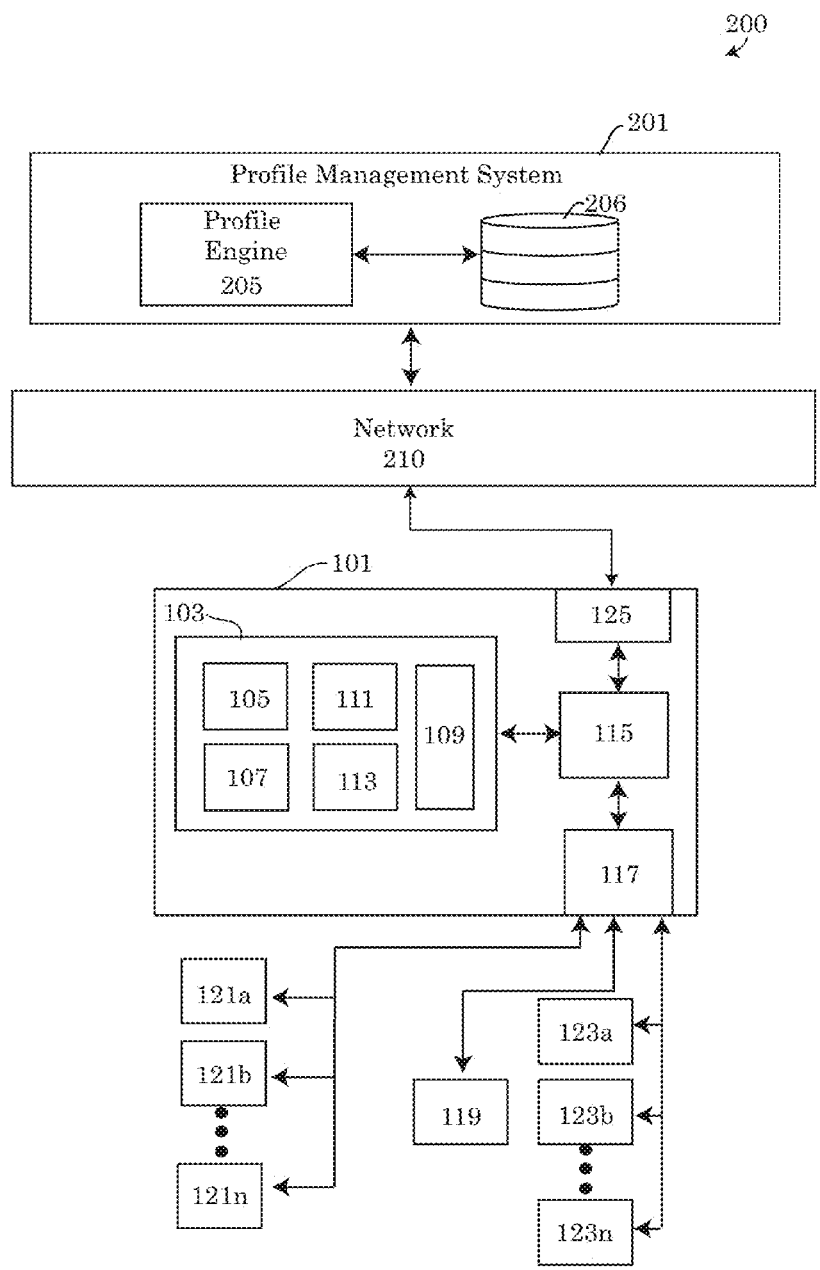
FIG. 2 depicts a schematic view of alternative embodiment of a system for automatically configuring multiple display devices, consistent with the embodiments of the present disclosure.

In some embodiments of the automatic configuration system 100, the user profiles may be locally stored by a memory device 115 connected to the computer system 101. Upon identification of a user, the profile module 105 may load the user profile from the memory device 115 and apply the customized settings to the display devices 121. In an alternative embodiment 200, the user profiles may be retrieved by the profile module 105 from a network accessible profile management system 201 or network accessible storage device. As shown in FIG. 2, the computer system 101 and the profile management system 201 may each be connected to a network 210. The network 210 may be a group of computer systems or other computing hardware devices linked together through communication channels to facilitate communication and resource sharing among the computer systems and hardware devices. Examples of network 210 may include a local area network (LAN), home area network (HAN), wide area network (WAN), back bone networks (BBN), peer to peer networks (P2P), campus networks, enterprise networks, the Internet, cloud computing networks and any other network known by a person skilled in the art.

Embodiments of the profile management system 201 may be a computing system or a component of a computing system and may be hardware-based, software-based or a combination thereof. In the Exemplary embodiment, the profile management system 201 may be a server connected to the network 201. The profile management system 201 may further comprise a profile engine 205 and a user profile database 206. Embodiments of the profile engine 205 may be tasked with fulfilling requests from the profile module 105 and delivering the requested information back to computer system 101. For example, a profile module may be requested to load a particular user profile in the memory device 115 of computer system 101. In response to the request to load a particular user profile, the profile module 105, connected to network 210 via a network interface controller 125, may transmit a request to the profile management system 201 for the data of the requested user profile. The profile engine 205 may receive the request transmitted over the network 210 by the profile module 105 and query the user profile database 206 for the requested user profile information. Once the query is completed, the profile engine may transmit the requested user profile data over network 210 back to the computer system 101, wherein the profile module 105 may load the user profile received from the profile management system 201 in the memory device 115.

One advantage of embodiment 200 comprising a network accessible profile management system 201 connected to computer system 101, is the ability of computer systems connected to the network 210 to retrieve user profile information and customized display device settings anywhere in the world where a connection to network 210 can be established to access the profile management system 201. A user may store, retrieve and apply customized display device settings described by the user's profile data for multiple display devices 121 that are connected to a plurality of different networked computer systems located in various locations in the world.

In order to assist with identifying different sets of display devices, which may be setup in different physical locations, embodiments of the display controller 103 may include a location module 107. The location module may include hardware and software capable of utilizing the global positioning system (GPS). For example a GPS antenna, transmitter, transponder, transceiver or receiver may be connected to the computer system 101 or integrated into the hardware of location module 107. The location module 107 may acquire the GPS location from GPS satellites and may store data relating to the location of the computer system 101 in the memory device 115 or the profile module 105. When a request is made by the computing system 101 to the profile management system 201 to provide a specific user profile, the location module 107 may provide alongside the request, GPS or other location information in order to more specifically identify the computer system 101 of the particular location. By providing location data to the profile management system 201, the location data may assist with providing specific customized display settings for the display device of the specific location because different display devices set in different locations may have a different set of customized display device 121 settings.

Embodiments of the location module 107 may save, store and update one or more sets of location information to the user profile when a particular user automatically configures the display devices 121. The location module 107 may communicate with the profile module 105 to correlate a particular set of custom display setting stored in the user profile to a particular location. For example, the location module may identify that the user is automatically configuring multiple display devices at a home location having a first set of GPS coordinates rather than a separate configuration by the same user at a separate office location having a second set of GPS coordinates. The location module and the accompanying coordinates tied to a particular device residing at a particular GPS coordinate may allow for the user to save settings in the user profile module 105 for display devices 121 present at a first location, while separately being capable of saving a separate set of settings to the user's profile for a second GPS location. In some embodiments, the user may tag or identify display devices 121 residing at a particular location as primary display devices, while other display devices remaining at one or more separate locations may be identified as a secondary display device.

Figure 3A:
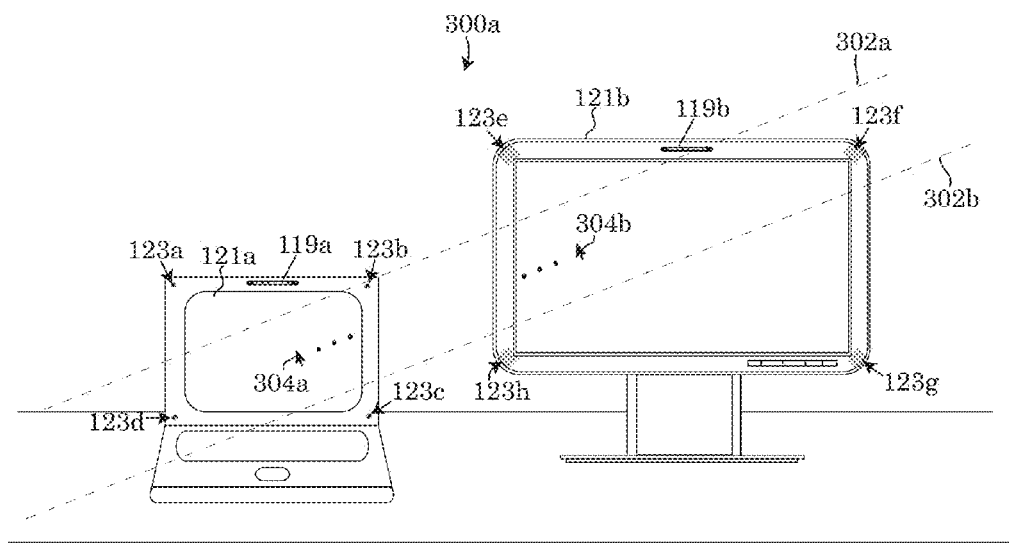
FIG. 3a illustrates an embodiment of a system for automatically configuring multiple display devices configured in a first position.
Figure 3B:
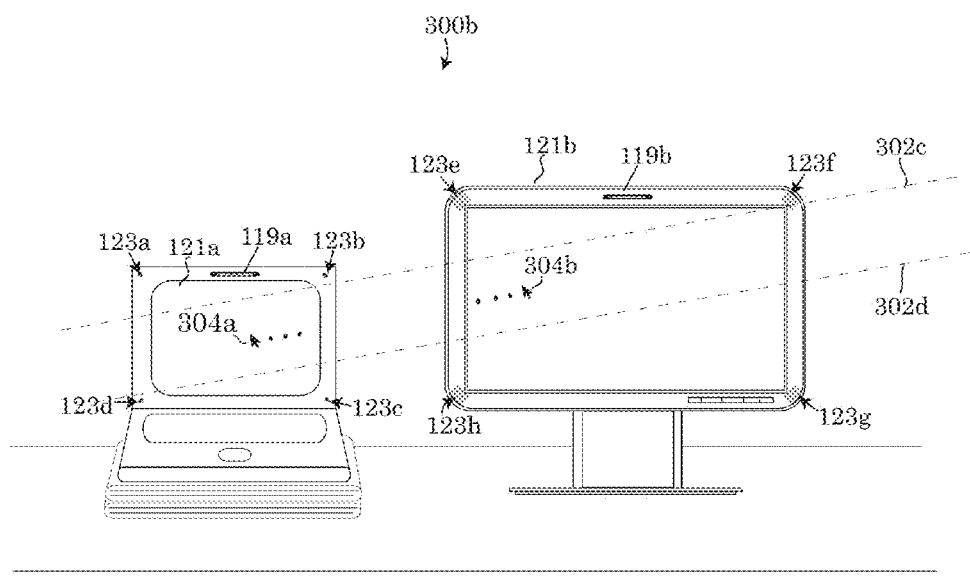
FIG. 3b illustrates an embodiment of the system for automatically configuring multiple display devices of FIG. 3a configured in a second position.
Figure 4:
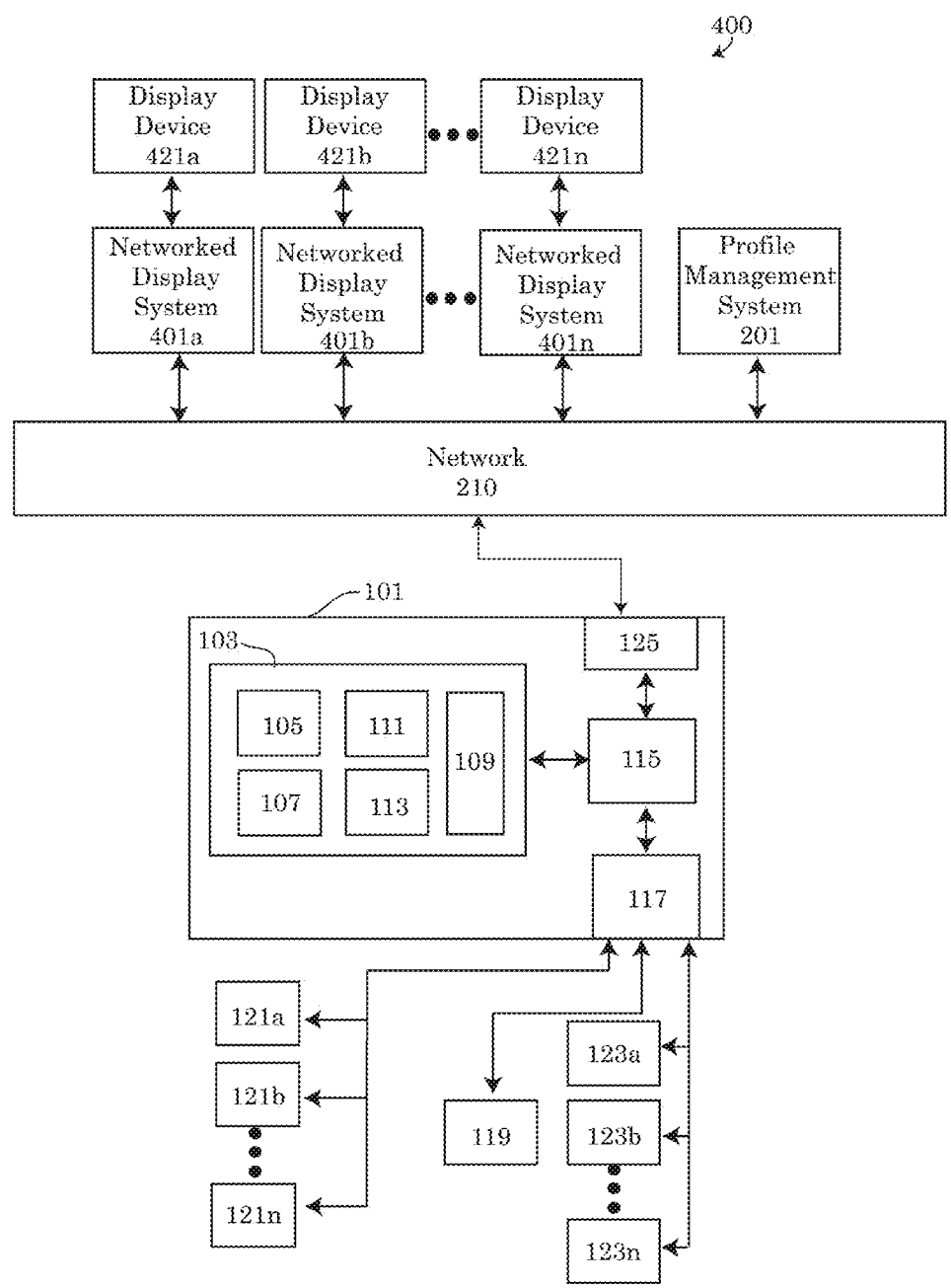
FIG. 4 depicts a schematic view of an alternative embodiment of a system for automatically configuring display devices shared by multiple users.

Embodiments of the display controller 103 may further comprise an orientation and proximity module 109 (hereinafter referred to as the "orientation module 109"). The orientation module 109 may use sensor data gathered by one or more display sensors 123, transmitted via the I/O interface to the computer system 101 to calculate the dimensions of each display device 121, the distance between the display devices 121 and the position of each of the display devices relative to one another. In some embodiments, the sensor data provided to the orientation module 109 may further calculate the transitional position of displayed objects and information as the displayed objects transition from a first display device 121*a* to a second display device 121*b* as shown in FIG. 3*a* and FIG. 3*b*. Examples of displayed objects may include cursors 304, program windows, widgets, etc. represented on the display device's graphical user interface (GUI).

The orientation module 109 may automatically adjust the calculated transitional point and thus the location of displayed objects transitioning between the display devices 121 as the proximity, orientation and dimensions of the display devices are changed or modified. The embodiments 300*a*, 300*b* of FIG. 3*a* and FIG. 3*b* provide an example of an automatic adjustment to the transitional point between two display devices 121 as the proximity or orientation of either the first display device 121*a* or the second display device 121*b* changes.

As shown in FIGS. 3*a*-3*b*, a first display device 121*a* is positioned in a first position proximate to a second display device 121*b*. Embodiments of the first display device 121*a* include a first set of display sensors 123*a*, 123*b*, 123*c*, 123*d*, wherein each of the first set of display sensors are positioned in each order of the first display device 121*a*. Similar to the first display device 121*a*, the second display device 121*b* may be equipped with a second set of display sensors 123*e*, 123*f*, 123*g*, 123*h*. Although only four sensors are shown for each of the display devices 121, any number of display sensors 123 may be present and positioned along each of the display devices 123. Display sensors 123 may be integrated into the display device 121, placing the sensor internally into the housing of the display device as exemplified by display sensors 123*a*, 123*b*, 123*c*, 123*d* of display device 121*a*. In other embodiments, the display sensors 123 may be external to the display device 121 or attached on the outside of the display device 121. An example of an external embodiment is shown by display device 121*b* having display sensors 123*e*, 123*f*, 123*g*, 123*h*.

Examples of display sensors may include optical sensors, electro-optical sensors, proximity sensors, motion sensors, acoustic sensors, environmental sensors, magnetic sensors, microelectromechanical (MEMS) devices, or mechanical sensors including tactile sensors, force sensitive resistors (FSR sensor), accelerometers (for example: capacitive accelerometers, strain gauge accelerometers, variable inductance accelerometers, magnetic accelerometers, heated gas accelerometers, optical fiber accelerometers, multi-axis accelerometers), pressure sensors (for example: mechanical pressure sensors, membrane and plate sensors, piezo resistive pressure sensors, differential pressure sensors, capacitive pressure sensors, magnetic pressure sensors, optoelectronic pressure sensors, Fabri-Perot optical resonator, vacuum sensors), gyroscopes (mechanical, Coriolis force, optical, resonant fiber optic and coil optical fiber gyroscopes), resistance-based or potentiometric position sensors, capacitive resistance sensors, linear voltage differential transformers, magnetostrictive linear position sensors, Eddy current based positions sensors, Hall Effect based magnetic position sensors, fiber-optic position sensors, optical position sensors and any other type of sensor capable of identifying the proximate size, location and orientation of each display device 121 relative to one another.

Embodiments of the display sensors 123 collect sensor data that may be transmitted to the orientation module 109, allowing for the orientation module 109 to calculate the physical properties and positioning of each display device 121 in order to create the proper transition of display objects when the display object is moved from the first display device 121*a* to the second display device 121*b* or vice versa. As shown in FIG. 3*a*, embodiment 300*a* illustrates an example of cursor movement between the first display device 121*a* and the second display device 121*b* and the pathway of transition calculated by the orientation module 109. As shown in FIG. 3*a*, cursor 304 moves from cursor position 304*a* to cursor position 304*b*. The guidelines 302*a*, 302*b* demonstrate the pathway that the cursor 304 may follow when moving along a selected path and transitioning from the first display device 121*a* to the second display device 121*b* based on the sensor data of the display sensors 123.

The embodiment of FIG. 3*b* demonstrates a recalculated pathway of cursor movements after adjusting the height of the first display device 121*a*. As depicted by the second set of guidelines 302*c*, 302*d*, after adjusting the height of first display device 121*a*, the orientation module 109 and the automatic configuration system 100, 200 may automatically adjust the angle of the transition of display objects as a function of the sensor data collected by the display sensors 123. As evident by the illustrations of FIG. 3*a* and FIG. 3*b*, as the height of the first display device 121*a* becomes more aligned with the height of the second display device 121*b*, the angle of travel of transitioning display objects between the display devices may be reduced. Likewise, a person skilled in the art should also understand that moving the display devices 121 closer or farther apart and raising or lowering either of the display devices 121 will also modify the orientation and proximity calculations of the orientation module and as a result automatically impacting the angle of transition between the display devices. Either raising or lowering the angle of transitioning display objects. Calculations relating to the dimensions of the display devices 121, the display device orientation, proximate location and the angle of transition may be saved and stored in the user profile maintained by the profile module 105 for retrieval and modification at a later point in time by the orientation module 109.

In some embodiments, the display controller 103 of the automatic configuration system 100, 200 may further comprise an optimization module 111. The optimization module 111 may perform the task of adjusting the display settings of each display device 121 as a function of collected data describing the user's personalized preferences and immediate conditions of the user ("user data"), environmental data relating to the surroundings of the display device 121 and sensor data received by the display sensors 123. Embodiments of user data may include stored information describing the user's preferred display settings. Preferred display settings may include display device 121 properties such as color saturation, brightness, contrast, hue, resolution, font size, object scaling, zoom level, GUI appearance and volume of audio.

An example of a user's personalized preference that may be collected as user data may include data collected from tracking a user's fine tuning adjustments of display setting, or a particular learned pattern for preferred display settings. Known or learned display settings may be tracked by the optimization module 111 and may be used by the optimization module to adjust the display settings of each display device 121 in order to provide a consistent appearance known to be preferred by a particular user. Moreover, in addition to learning a user's personalized preference for display device settings, the optimization module may further identify and learn preferred application behaviors of the user. Preferred application behaviors may describe the manner in which the user uses one or more particular application. The computer system 101, namely the optimization module 111 may track, record and identify patterns in user behavior when a particular application is opened. For example, the optimization module 111 may learn that a user usually places an application window in a particular location of a particular display device once the application is opened or adjust the size of window. The optimization module 111 may store these application preferences in the user profile. This may allow for the optimization module 111 to automatically adjust applications and other displayed objects pre-emptively upon opening the application as a function of the learned behavior, correctly adjusting and placing the displayed object or application in the preferred position without further assistance or direction from the user.

User data that may also be collected and used by the optimization module 111 to adjust display settings of each display device may further include the immediate conditions of the user. For example, the optimization module 111 may utilize a biometric input device or other input device such as a camera in combination with facial recognition software to detect a user's head movements, eye movements, eye gaze, angle and frequency of head rotation, fatigue or eye strain. The optimization module 111 may use the condition of the user adjust the display settings to a more optimal setting. For example to reduce a level of detected eye strain or fatigue, the optimization module may reduce the brightness, increase the zoom level or scaling to make displayed objects larger, or change the display color to either a cooler or warmer palette.

In some embodiments, the optimization module 111 may take environmental data of the immediate area surrounding the display devices 121 to assist in calculating and identifying the optimal display settings to automatically implement. The environmental data may be collected by one or more input devices such as a camera, biometric input device 119, light detector or other sensor device, including any sensor data from the display sensors 123 that may provide information regarding the surrounding environment of the display devices 121. For example, a camera, light detector or display sensor 123 may identify the level of ambient lighting (either natural or man-made) and adjust the display settings to provide a displayed image on the display device that is most suitable, accurate and comfortable to the specific user. For example, the environmental data may indicate that the user is actively using the display devices in a dark room at night time. To combat eye strain or fatigue, the optimization module 111 may adjust the display settings by reducing the brightness of the display devices and adjust the color saturation of the color palette to provide a warmer image that may cause less strain on the user.

In some embodiments of the automatic configuration system 400, the system 400 may be operated and used by a plurality of users (referred to as a multiple user scenario). Each of the plurality of users may each have a display device 121, 421*a*, 421*b* . . . 421*n* dedicated to each individual or corresponding networked display computer system 101, 401*a*, 401*b* . . . 401*n* in some embodiments, wherein each networked display computer system 101, 401*a*, 401*b* . . . 401*n* displays on the corresponding display device 121, 421*a*, 421*b* . . . 421*n* the displayed objects of each of the networked display devices of the plurality of connected users. In alternative embodiments, each networked display system 401*a*, 401*b* . . . 401*n* may contribute display data which may be compiled and presented onto a single display device 121 displaying the presentation materials of each of the plurality of users.

In a multi-user scenario 400, a team display module 113 may identify the number of users connected to the display device and/or providing display data to the display device 121, 421. The team display module 113 may control and or modulate the incoming and outgoing data from each of the display devices 121, 421 to ensure that the display devices 121, 421 display each of the contributing users contributing data and displays the information accordingly. For example, in a web conference or presentation setting, each user's display devices 121, 421 may display only the user's own display data, divide the screen space of each display device 121, 421 by the number of users present or a combination thereof, wherein the display device 121,421 may display each individuals entire display device screen while a separate external display device (not shown) may provide a divided image containing the display content of each user connected to the external or shared display device.

Embodiments of the multi-user scenario 400 may present display data to one or more of the display devices 121, 421 in a variety of manners. For example, the display devices 121, 421 may present the display data from each display device 121, 421 by allotting an equal amount of display area 522, 524, 526, 528 for each user's display data. In alternative embodiment, each user's display area 522, 524, 526, 528 may be proportioned based on the particular role of the user, their seniority or other defining hierarchy of importance, wherein more important or senior users having a more prominent role in the conference or presentation may have a larger display area 522, 524, 526, 528. In yet another alternative embodiment, the size of the display area 522, 524, 526, 528 allotted to each particular user may dynamically vary. For example, a user currently talking, presenting or providing data that is important to the discussion or presentation may be allotted a larger amount of the shared display area 522, 524, 526, 528 relative to the other users also connected and providing display data.

Figure 5:
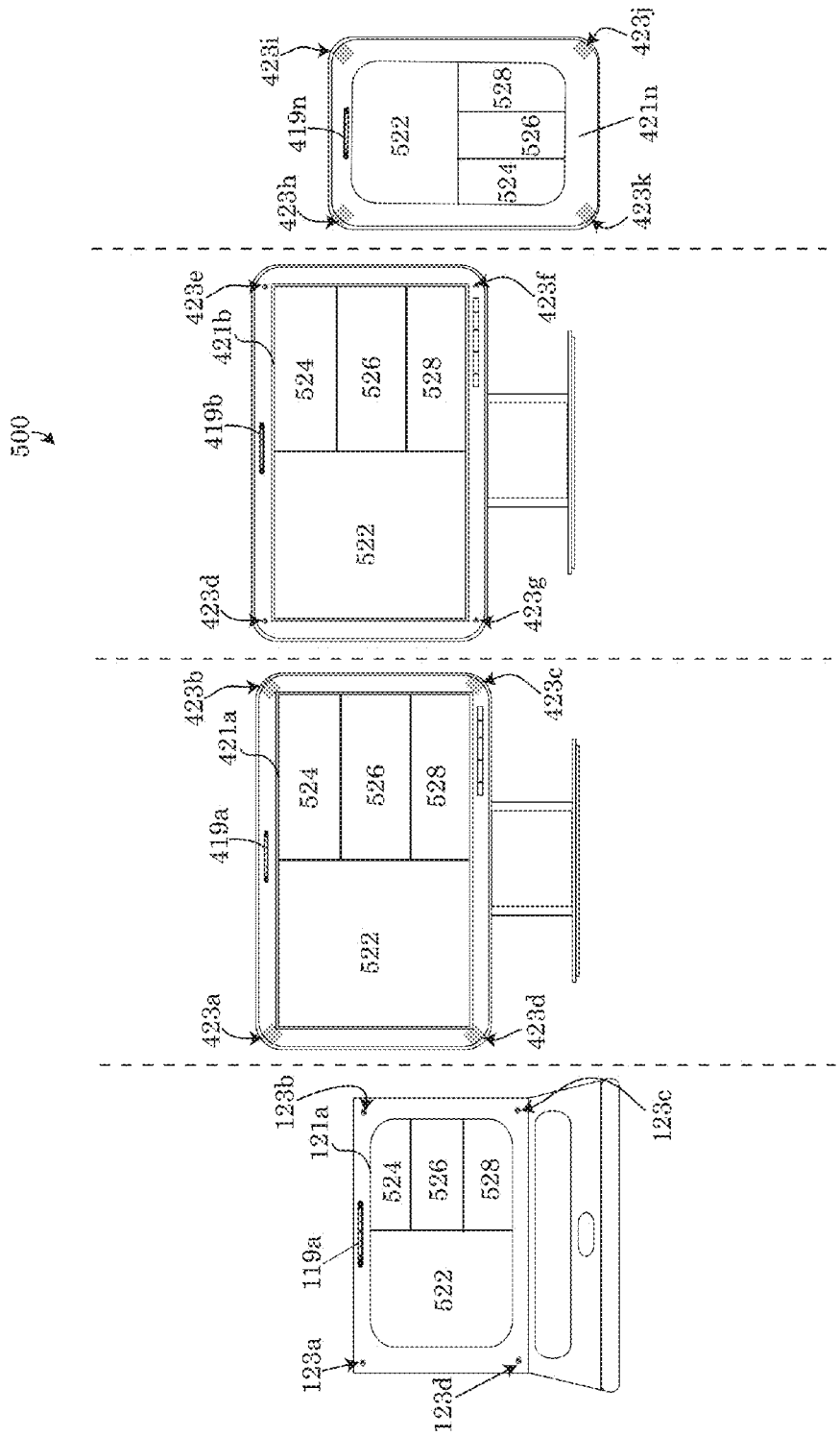
FIG. 5 illustrates an embodiment of multiple display devices automatically configured for sharing a display area with multiple users.
Figure 6:
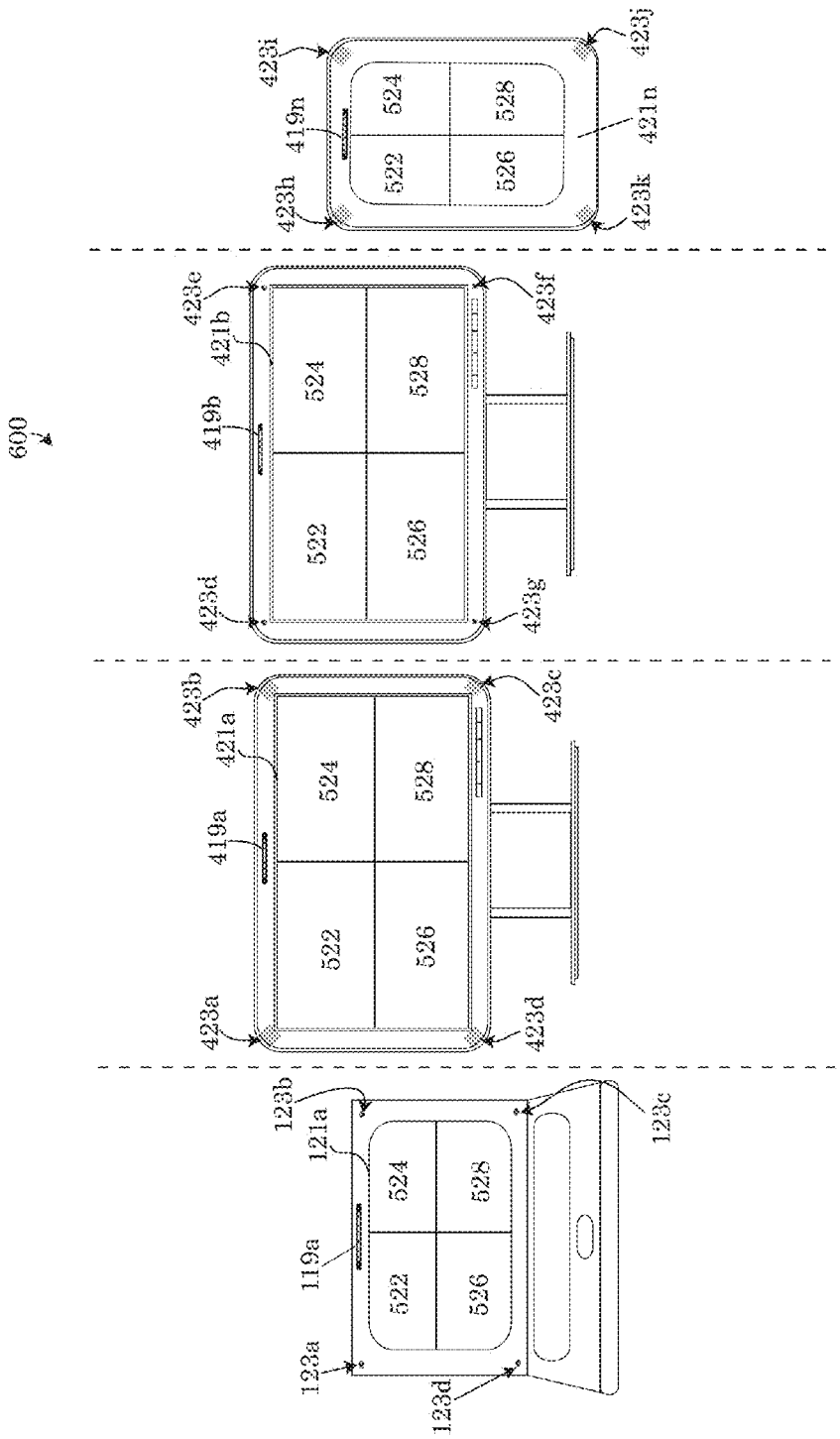
FIG. 6 illustrates an alternative embodiment of multiple display devices automatically configured for sharing a display area with multiple users.

Embodiment 500 of FIG. 5 provides an example of a multiple user scenario wherein the display area 522, 524, 526, 528 of each display device 121, 421 allots an amount of space to each user either dynamically based on importance of the user's display data to the conference, discussion or presentation or based on a user's role or seniority. For example, as shown in FIG. 5, each display device viewing the display data of the group of users can be viewed independent by each of the display devices 121, 421 shown in the figure. Each display device 121, 421, includes a screen divided by a plurality of display areas 522, 524, 526, 528. In the example illustrated, the user with the most important role or most senior position may be awarded display area 522 which is allotted the most space, whereas the remaining display areas 524, 526, 528 are provided to other users having a lower role or seniority. Likewise, in a dynamic embodiment wherein the amount of area is proportionally allotted to users currently presenting an important piece of data, display area 522 may be awarded to the user currently making a presentation, whereas the remaining users connected to the display device 121, 421 currently viewing the presentation may be assigned the smaller display areas 524, 526, 528. Alternatively, FIG. 6 illustrates an embodiment 600 of a multi-user scenario wherein display areas 522, 524, 526, 528 equally divide the display device 121, 421 as a function of the number of users connected to the display device 121, 421.

Method for Automatically Configuring Multiple Display Devices

Figure 7:
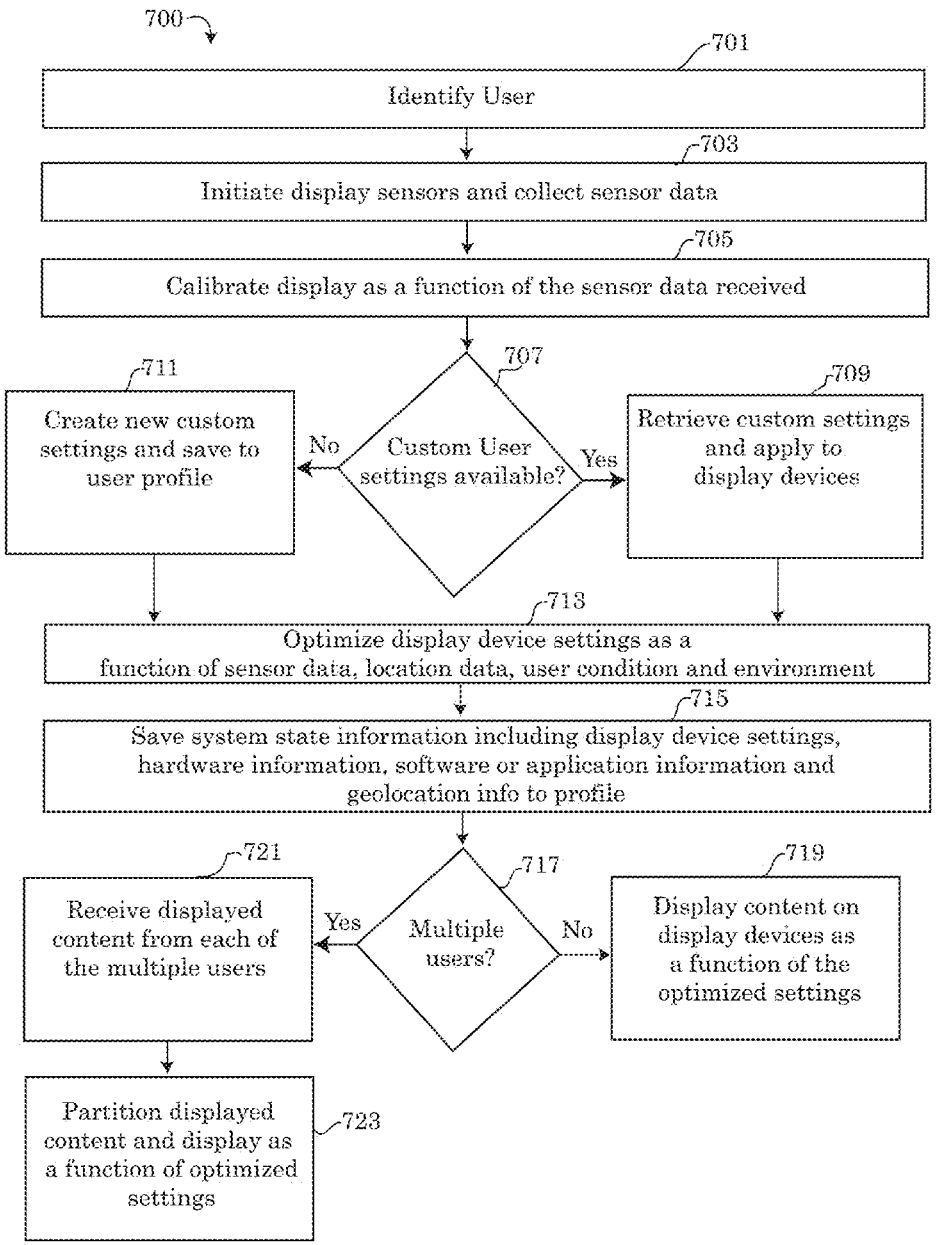
FIG. 7 depicts a flow chart describing an embodiment of a method for automatically configuring multiple display devices.

The drawing of FIG. 7 represents an embodiment of a method or algorithm that may be implemented for automatically configuring multiple display devices in accordance with the automatic configuration systems described in FIGS. 1-6 using one or more computers as defined generically in FIG. 8 below, and more specifically by the specific embodiments of FIGS. 1-6. A person skilled in the art should recognize that the steps of the algorithm described in FIG. 7 may be performed in a different order than presented by FIG. 7 and the algorithm may not require all of the steps described herein to be performed. Rather some embodiments may automatically configure multiple display devices using only one or more of the steps discussed below.

Embodiments of method 700 for automatically configuring multiple display devices may begin at step 701. In step 701, the automatic configuration systems 100, 200, 400 may identify one or more users using the system 100, 200, 400 or viewing the display devices 121,421 of the system 100, 200, 400. Step 701 may be performed by manually upon user input or login in some embodiments, while in the exemplary embodiment; the step of identifying the user in step 701 may be performed automatically. The user may be identified for by the system 100, 200, 400 for example using methods of identification such as username and password or biometric identification. Embodiments including biometric identification may utilize the biometric input device to scan the user for an identifying characteristic and match the identified characteristic to a biometric database storing characteristics of a plurality of users. Characteristics that may be scanned by a biometric input device may include the user's face, fingerprints, eyes (e.g. iris or retina), hands, signature, voice patterns, keystrokes, DNA, user movements or gait.

Once the user is identified in step 701, the method for automatically configuring a multiple display devices 700 may proceed to step 703. In step 704, each of the display sensors 123 attached to each respective display device 121 of the system 100, 200, 400 may be initiated and begin collecting sensor data. The sensor data collected in step 703 may include information identifying the physical dimensions of the each display device (e.g. length, width, height, depth), the position and orientation of each display device 121, the proximity of each display device 121 relative to the other display devices 121 of the system 100, 200, 400, including measurements of distance of separation between each display device and height differentials. In some embodiments, the location module 107 may collect location data such as the GPS coordinates of the display devices being initiated.

In step 705, the orientation module 109 of the configuration system 100, 200, 400 may calibrate each of the display devices 121 for proper orientation, alignment and proximity between each of the display devices 121 as a function of the sensor data collected in step 703. This calibration step may include performing calculations by the orientation module 109 of the display device's 121 dimensions and proximity in order to adjust and smooth the transitioning point between the multiple display devices and shown in FIG. 3a and FIG. 3b. The orientation module 109 may adjust the computer system's 101 orientation of each display device to allow for a more accurate and smoother transition of display objects such as mouse cursor 304, from a first display device 121a to a second display device 121b, automatically, without requiring realignment of the display devices physically or virtually in the menus of an operating system.

Proceeding to step 707, the profile module 105 of the system 100, 200, 400 may determine whether or not customized user settings are available and stored in a user profile for the user identified in step 701. The customized settings of the user's profile may be stored locally in one or more memory devices 115 connected to the system 100, 200, 400 either locally or accessible via a network connection 210. If, in step 707 it is determined by the profile module 105 that custom user settings for the user identified in step 701 have been previously created and stored as part of the user's profile, the profile module 105 of the system 100, 200, 400 may proceed to step 709, retrieving the custom settings and applying the settings to the display devices 121. In the exemplary embodiment, the retrieval of the customized settings of the user's profile in step 709 may include transmitting a request for the user profile information to the profile management system 201, querying by the profile engine 205, the requested information stored by the user profile database 206, receiving the requested user profile information and transmitting the user profile information via network 210 back to the computer system 101.

Alternatively, the profile module 105 may make the determination in step 707 that the user identified in step 701 does not have customized user settings stored in a user profile or that the user identified may be a new user and therefore a user profile associated with the identified user has not yet been created. If a user profile does not yet exist for the identified user or customized settings have not been saved to the user profile, the profile module 105 in step 707 may create a new user profile associated with the user's identity identified in step 701 and apply custom settings to the user profile automatically for the user.

Following either the retrieval of customized settings in step 709 or the creation of new custom settings and/or profile in step 711, the optimization module 111 of the system 100, 200, 400 may, in step 713, optimize the display settings of each display device 121 as a function sensor data, location data, user condition, and environment data (hereinafter referred to collectively as "collected data") provided to the system 100, 200, 400. The collected data may be collected by the system from a combination of sources, including data collected by the display sensors 123, biometric input device, camera systems, external sensors and pattern recognition software loaded in memory device 115 logging keystrokes, mouse movements, program or application preferences or input data from other input devices. Embodiments of the collected data may include information surrounding the ambient lighting or conditions of the display device's surrounding environment that may impact the display settings, user head movements, eye movements, eye gaze, angle and frequency of head rotation, fatigue or eye strain. As a function of the data collected, the optimization module may adjust the display settings in step 713 to according to the desired settings learned by the system 100, 200, 400 or settings identified by the system 100, 200, 400 to promote optimal efficiency and/or user comfort.

In some embodiments, the system 100, 200, 400 may periodically or dynamically adjust the display settings of each display device 121 as the collected data is continuously updated and retrieved. The display systems and the surrounding environment may not be confined to a static environment and therefore as the circumstances affecting the environment, user and the display devices 121 change, the system 100, 200, 400 may automatically optimize the display settings of step 713 and calibration settings of step 705 to compensate for changes to the user's condition, the surrounding environment or changes to the display devices 121 position and orientation.

In step 715, the state information of the system 100, 200, 400 may be saved to the user's profile for the user identified in step 701. The saved system state information may include optimized display settings implemented in step 713, hardware information of the display devices calibrated in step 705 including the type of display device and dimensions, geolocation information derived from the location data of the location module 107 and program or application preferences provided as part of the collected data of step 713.

Embodiments of the system 100, 200, 400 may additionally, in step 717, make a determination of whether or not multiple users are connecting to one or more display devices 121,421 of the computer system 101 or network display systems 401. If, in step 717 it is determined that the display devices 121, 421 are not sharing display data with multiple users, the method may proceed to step 719 and display the display data as output on the display devices 121 as a function of the optimized display settings of step 713 on the display devices 121 calibrated in step 705.

Alternatively, if a determination is made in step 717 that multiple users are sharing display data with the display devices 121, 421, the system 100, 200, 400 may proceed to step 721 of the multi-user scenario. In step 721 display data may be received by each of the multiple users or the display data may be transmitted by each user to a centralized display device. In step 723, the display device(s) receiving the display data in step 721 and a team display module 113 may partition the display devices to present the display data of each user on a shared screen space of the display device 121, 421. For example, the screen space may be partitioned in step 723 in the manner demonstrated in FIG. 5 or FIG. 6, wherein the display data of each user is allotted a defined space of the display device which may be allotted equally, based on role or activity in some embodiments as discussed above.

Computer System

Figure 8:
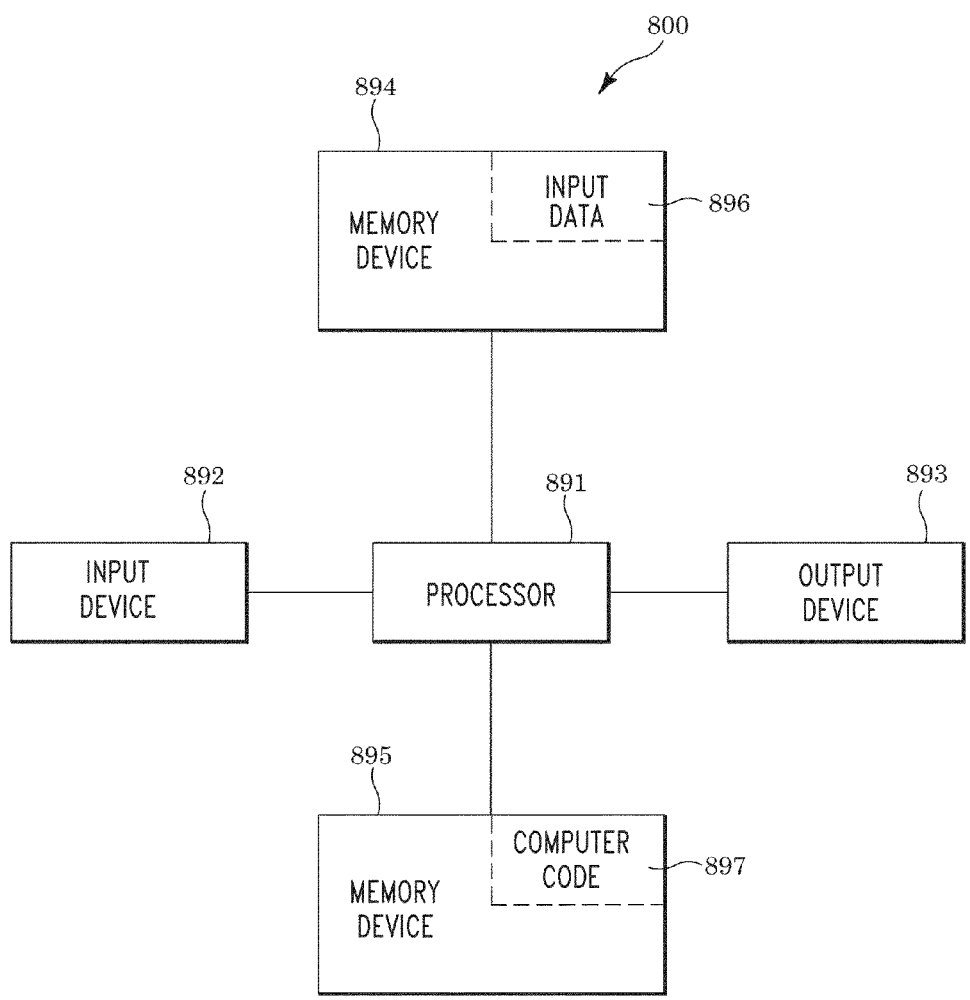
FIG. 8 depicts a block diagram of an embodiment of a computer system capable of implementing methods for automatically configuring multiple display devices.

Referring to the drawings, FIG. 8 illustrates a block diagram of a computer system 800 that may be included in the systems of FIGS. 1-6 and for implementing methods for automatically configuring multiple display devices as shown in the embodiment of FIG. 7 and in accordance with the embodiments of the present disclosure. The computer system 800 may generally comprise a processor, otherwise referred to as a central processing unit (CPU) 891, an input device 892 coupled to the processor 891, an output device 893 coupled to the processor 891, and memory devices 894 and 895 each coupled to the processor 891. The input device 892, output device 893 and memory devices 894, 895 may each be coupled to the processor 891 via a bus. Processor 891 may perform computations and control the functions of computer 800, including executing instructions included in the computer code 897 for tools and programs for automatically configuring multiple display devices, in the manner prescribed by the embodiments of the disclosure using the systems of FIGS. 1-6, wherein the instructions of the computer code 897 may be executed by processor 891 via memory device 895. The computer code 897 may include software or program instructions that may implement one or more algorithms for implementing the methods for automatically configuring multiple display devices, as described in detail above. The processor 891 executes the computer code 897. Processor 891 may include a single processing unit, or may be distributed across one or more processing units in one or more locations (e.g., on a client and server).

The memory device 894 may include input data 896. The input data 896 includes any inputs required by the computer code 897. The output device 893 displays output from the computer code 897. Either or both memory devices 894 and 895 may be used as a computer usable storage medium (or program storage device) having a computer readable program embodied therein and/or having other data stored therein, wherein the computer readable program comprises the computer code 897. Generally, a computer program product (or, alternatively, an article of manufacture) of the computer system 800 may comprise said computer usable storage medium (or said program storage device).

Memory devices 894, 895 include any known computer readable storage medium, including those described in detail below. In one embodiment, cache memory elements of memory devices 894, 895 may provide temporary storage of at least some program code (e.g., computer code 897) in order to reduce the number of times code must be retrieved from bulk storage while instructions of the computer code 897 are executed. Moreover, similar to processor 891, memory devices 894, 895 may reside at a single physical location, including one or more types of data storage, or be distributed across a plurality of physical systems in various forms. Further, memory devices 894, 895 can include data distributed across, for example, a local area network (LAN) or a wide area network (WAN). Further, memory devices 894, 895 may include an operating system (not shown) and may include other systems not shown in FIGS. 1-6.

In some embodiments, the computer system 800 may further be coupled to an Input/output (I/O) interface and a computer data storage unit. An I/O interface may include any system for exchanging information to or from an input device 892 or output device 893. The input device 892 may be, inter alia, a keyboard, a mouse, sensors, biometric input device, camera, etc. The output device 893 may be, inter alia, a printer, a plotter, a display device (such as a computer screen or monitor), a magnetic tape, a removable hard disk, a floppy disk, etc. The memory devices 894 and 895 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 200, and may include any type of transmission link, including electrical, optical, wireless, etc.

An I/O interface may allow computer system 800 to store information (e.g., data or program instructions such as program code 897) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk).

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to accessing content of a shared account. Thus, an embodiment of the present invention discloses a process for supporting computer infrastructure, where the process includes providing at least one support service for at least one of integrating, hosting, maintaining and deploying computer-readable code (e.g., program code 897) in a computer system (e.g., computer 800) including one or more processor(s) 891, wherein the processor(s) carry out instructions contained in the computer code 897 causing the computer system to automatically configure multiple display devices. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method of accessing content of a shared account. Thus the present invention discloses a process for supporting, deploying and/or integrating computer infrastructure, integrating, hosting, maintaining, and deploying computer-readable code into the computer system 800, wherein the code in combination with the computer system 800 is capable of performing a method for automatically configuring multiple display devices.

A computer program product of the present invention comprises one or more computer readable hardware storage devices having computer readable program code stored therein, said program code containing instructions executable by one or more processors of a computer system to implement the methods of the present invention.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatically configuring multiple display devices, the method comprising:

identifying, by a central processing unit (CPU), users of the multiple display devices engaged in a communication and a role associated with each of the users engaged in the communication;

automatically partitioning, by the CPU, screen space of each of the multiple display devices as a function of a total number of the users and based on the role of each of the users in the communication;

automatically optimizing, by the CPU, display settings of the multiple display devices as a function of at least the identified users; and displaying, by the CPU, display data outputted by the multiple display devices at the automatically optimized display settings.

2. The method of claim 1, further comprising:
receiving, by the CPU, sensor data from a plurality of sensors connected to the multiple display devices; and
calibrating, by the CPU, an orientation and proximity of each of the multiple display devices as a function of the sensor data.

3. The method of claim 2, wherein the sensor data received by the CPU comprises information about each of the multiple display devices and the sensor data includes data selected from the group consisting of display device dimensions, display device orientation, geolocation of the multiple display devices and a measurement of proximity between each of the multiple display devices.

4. The method of claim 1, wherein the step of automatically optimizing further comprises the step of retrieving and applying customized user settings automatically as a function of the users identified from a storage device selected from the group consisting of a local storage device a network accessible storage device and a combination thereof.

5. The method of claim 1, wherein the step of automatically optimizing comprises adjustments to display settings of the multiple display devices selected from the group consisting of brightness, contrast, color saturation, resolution, GUI appearance, font size, zoom level and a combination thereof.

6. The method of claim 1, wherein the user data is selected from the group consisting of application specific location preferences, eye movement of the users, angle of a user's head rotation, frequency of a user's head rotation and eye strain of the users.

7. The method of claim 1, further comprising the step of:
further identifying, by the CPU, one or more additional users connected to the multiple display devices; and
modifying the partitioning, by the CPU, of the screen space of the multiple display devices as a function of the total number of the users from the partitioning as the function of the role of each of the users in the communication to: equal partitioning or partitioning as a function of user activity.

8. The method of claim 1, further comprising providing at least one support service for at least one of creating, integrating, hosting, maintaining, and deploying computer-readable program code in a computer system, where the computer-readable program code in combination with the computer system is configured to implement the steps of identifying, receiving, calibrating, automatically optimizing and displaying.

9. A computer system, comprising:
a central processing unit (CPU);
a memory device coupled to the CPU;
multiple display devices coupled to the CPU;
a sensor connected to the multiple display devices; and
a computer readable storage device coupled to the processor, wherein the computer readable storage device contains program code executable by the CPU via the memory device to implement a method for automatically configuring the multiple display devices comprising the steps of:
identifying, by the CPU, users of the multiple display devices engaged in a communication and a role associated with each of the users engaged in the communication;
automatically partitioning, by the CPU, screen space of each of the multiple display devices as a function of a total number of the users and based on the role of each of the users in the communication;
automatically optimizing, by the CPU, display settings of the multiple display devices as a function of at least the identified users; and
displaying, by the CPU, display data outputted by the multiple display devices at the automatically optimized display settings.

10. The system of claim 9, wherein the step of identifying the users includes the step of biometrically scanning the users and comparing the users being scanned to a biometric database of users.

11. The system of claim 9, wherein the sensor data received by the CPU comprises information about each of the multiple display devices and the sensor data includes data selected from the group consisting of display device dimensions, display device orientation, geolocation of the multiple display devices and a measurement of proximity between each of the multiple display devices.

12. The system of claim 9, wherein the step of automatically optimizing comprises adjustments to display settings of the display devices selected from the group consisting of brightness, contrast, color saturation, resolution, GUI appearance, font size, zoom level and a combination thereof.

13. The system of claim 9, wherein user data is selected from the group consisting of application specific location preferences, eye movement of the users, angle of a user's head rotation, frequency of a user's head rotation and eye strain of the users.

14. The system of claim 9, further comprising the step of:
further identifying, by the CPU, one or more additional users connected to the multiple display devices; and
modifying the partitioning, by the CPU, of the screen space of the multiple display devices as a function of the total number of the users from the partitioning as the function of the role of each of the users in the communication to: equal partitioning or partitioning as a function of user activity.

15. A computer program product comprising:
one or more computer readable hardware storage devices having computer readable program code stored therein, said computer readable program code containing instructions executable by one or more central processing units (CPU) to implement a method for automatically configuring multiple display devices comprising the steps of:
identifying, by the CPU, users of the multiple display devices engaged in a communication and a role associated with each of the users engaged in the communication;
automatically partitioning, by the CPU, screen space of each of the multiple display devices as a function of a total number of the users and based on the role of each of the users in the communication;
automatically optimizing, by the CPU, display settings of the multiple display devices as a function of at least the identified users; and
displaying, by the CPU, display data outputted by the multiple display devices at the automatically optimized display settings.

16. The computer program product of claim 15, wherein the step of identifying the users includes the step of biometrically scanning the users and comparing the users being scanned to a biometric database of users.

17. The computer program product of claim 15, wherein the sensor data received by the CPU comprises information about each of the multiple display devices and the sensor data includes data selected from the group consisting of display device dimensions, display device orientation, geolocation of the multiple display devices and a measurement of proximity between each of the multiple display devices.

18. The computer program product of claim 15, wherein the step of automatically optimizing further comprises the steps of:
  retrieving and applying customized user settings automatically as a function of the users identified from a storage device selected from the group consisting of a local storage device a network accessible storage device and a combination thereof; and
  adjusting display settings of the multiple display devices selected from the group consisting of brightness, contrast, color saturation, resolution, GUI appearance, font size, zoom level and a combination thereof.

19. The computer program product of claim 15, wherein the step of automatically optimizing comprises adjustments to display settings of the multiple display devices selected from the group consisting of brightness, contrast, color saturation, resolution, GUI appearance, font size, zoom level and a combination thereof.

20. The computer program product of claim 15, wherein the user data is selected from the group consisting of application specific location preferences, eye movement of the user, angle of a user's head rotation, frequency of a user's head rotation and eye strain of the users.

* * * * *